United States Patent

Lin et al.

[11] Patent Number: 5,113,881
[45] Date of Patent: May 19, 1992

[54] DYNAMIC ULTRASONIC CLEANING AND DISINFECTING DEVICE AND METHOD

[76] Inventors: Israel Lin, Kerem Maharal 30840; David Erel, 8 Mordechai St., Ramat Hasharon 47441, both of Israel

[21] Appl. No.: 542,033

[22] Filed: Jun. 22, 1990

[30] Foreign Application Priority Data

Jun. 25, 1989 [IL] Israel ............................. 090740

[51] Int. Cl.$^5$ ............................................. B08B 3/10
[52] U.S. Cl. ................................... 134/1; 134/25.3; 134/35; 134/163; 134/157; 134/184
[58] Field of Search ................... 134/1, 154, 163, 187, 134/188, 25.3, 157, 35; 68/355, 23; 99/516

[56] References Cited

U.S. PATENT DOCUMENTS

| | | | |
|---|---|---|---|
| 1,705,779 | 3/1929 | Nelson | 68/23 |
| 2,141,713 | 12/1938 | Hensler et al. | 134/163 |
| 2,910,390 | 10/1959 | Gruettner et al. | 134/163 X |
| 2,982,524 | 5/1961 | Bland | 68/355 |
| 2,985,003 | 5/1961 | Gelfand et al. | 134/184 |
| 3,371,233 | 2/1968 | Cook | 134/184 |
| 3,444,710 | 5/1969 | Gaugler et al. | 68/355 |
| 3,573,983 | 4/1971 | Antonevich | 134/184 |
| 3,873,071 | 3/1975 | Tatabe | 134/184 |
| 4,142,541 | 3/1979 | Bossert et al. | 99/516 X |
| 4,236,541 | 12/1980 | Cipriani | 99/516 X |
| 4,409,999 | 10/1983 | Pedziwitar | 134/184 X |
| 4,710,233 | 12/1987 | Honmann et al. | 134/184 X |
| 4,893,320 | 1/1990 | Yanagi et al. | 134/184 |

FOREIGN PATENT DOCUMENTS

| | | | |
|---|---|---|---|
| 215111 | 5/1961 | Austria | 68/355 |
| 2547554 | 4/1977 | Fed. Rep. of Germany | 134/184 |
| 624730 | 9/1961 | Italy | 134/147 |

*Primary Examiner*—Frankie L. Stinson
*Attorney, Agent, or Firm*—Edward Langer

[57] ABSTRACT

A device for the ultrasonic cleaning and disinfecting of fruit and vegetables, which facilitates removing practically all resudues of contaminants such as mud, biological dirt, microbiological flora like mold, worms, bacteria, germs, and chemicals such as herbicides, pesticides, fungicides, fertilizer remains etc., from rough or smooth surfaces of fruit and vegetables of all types. The device is equipped to stir the fruit and vegetable items within a cleaning tank filled with water, so as to expose all of their sides to a maximum level of vibration energy, achieving a predetermined cleaning probability.

22 Claims, 3 Drawing Sheets

DYNAMIC ULTRASONIC CLEANING AND DISINFECTING DEVICE AND METHOD

FIELD OF THE INVENTION

The present invention relates to a device for cleaning, disinfecting and washing fruit and vegetables, and more particularly, to an ultrasonic cleaning device which applies ultrasonic vibrations for cleaning.

BACKGROUND OF THE INVENTION

In prior art U.S. Pat. No. 4,721,624, there is disclosed a method of removing pesticides from fruits by evaporating the pesticides under steam and extracting the vapor. This method has the disadvantage of damaging the freshness of the fruit.

It is evident that spraying substantial amounts of pesticides, herbicides and fungicides is required to prevent drastic reduction in fruit and vegetables yields as a result of damage inflicted on trees, plants, fruit and vegetables by insects, worms, fungi, viruses, bacteria etc. At the same time, there is increasing public awareness of the cumulative health damage caused by the practically unavoidable regular consumption of minute residues of toxic pesticides, herbicides and fungicides, as well as microbiological contaminants.

It is also becoming increasingly evident to the public that the everyday usage of toxic agents will only increase, and that new, more active poisonous agents are being introduced daily to fight insects and microbiological contaminants which become immune to the existing products. Moreover, the decreasing availability of water will increase the usage of secondary, less clean water sources for irrigation, adding an additional source of chemical and biological contamination.

The only means commonly available to clean and wash away all existing contamination from fruit and vegetables with the aid of detergents and disinfectants is by hand washing at the domestic level, and by submerging, stirring and washing at the industrial or public kitchen level. Extensive tests have shown that both methods are inefficient in removing physical, biological and chemical contaminants to a satisfactory degree, especially from small fruit like grapes or from leafy vegetables.

Very often people use only tap water to wash fruit or vegetables because of the effort and time required for a thorough cleaning. Using detergents or chemicals entails using gloves to protect the hands from the cumulative damage inflicted on the skin by exposure to these detergents and disinfectants.

Therefore, it would be desirable to provide a device for easy and effective cleaning of fruits and vegetables.

SUMMARY OF THE INVENTION

Accordingly, it is a principal object of the present invention to overcome the above-described disadvantages of prior art fruit and vegetable cleaning methods.

It has been demonstrated by the inventors that by applying ultrasonic vibration of a given duration, intensity, direction and frequency, combined with properly matched cleaning agents, surface active agents, flotation agents and disinfectants, the contamination level on fruit and vegetables of all kinds can be reduced to less than a third, as compared to the levels achieved in hand washing using the same cleaning and disinfecting agents. Currently there is no similar device on the market, which provides efficient and sufficient removal of all types of commonly existing contaminants and chemicals from the surface of fruit and vegetables, quickly and effortlessly.

In accordance with a preferred embodiment of the present invention, there is provided a device for the ultrasonic cleaning and disinfecting of fruit and vegetables, which facilitates removing practically all residues of contaminants such as mud, biological dirt, microbiological flora like mold, fungi, worms, bacteria, germs, and chemicals such as herbicides, pesticides, fungicides, fertilizer remains etc., from rough or smooth surfaces of fruit and vegetables of all types.

In addition, the device enables cleaning of the inaccessible sections of fruit or vegetables, or cleaning fruit and vegetables which are inherently unsuitable for proper washing such as grapes, strawberries, lettuce etc., by applying a properly adapted ultrasonic vibration field, combined with suitable cleaning, disinfecting, surface active, and flotation agents (hereinafter the "cleaning agents"), which dramatically improves the cleaning of vegetables and fruit. The activities required of the user if a fully manual device is used are:

a) placing the contaminated items in the cleaning tank;
b) filling up the cleaning tank with clean water;
c) adding the correct amount of a mixture of active agents;
d) subjecting the items to be cleaned to the suitable cleaning cycle by selecting the relevant process parameters or the full program via marked push buttons or rotary knobs or similar devices; and
e) rinsing under tap water.

Steps b, c and e can be automated as will be detailed herein.

It is an object of the present invention to provide an efficient and intensive device for effortless cleaning, disinfecting and washing fruit and vegetables, in a cleaning process at two consumer levels:

a. Domestic.
b. Public users like restaurants, hotels, hospitals, public kitchens, industry, etc.

Other features and advantages of the invention will become apparent from the drawings and the description contained hereinbelow.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENT

Figure 1:
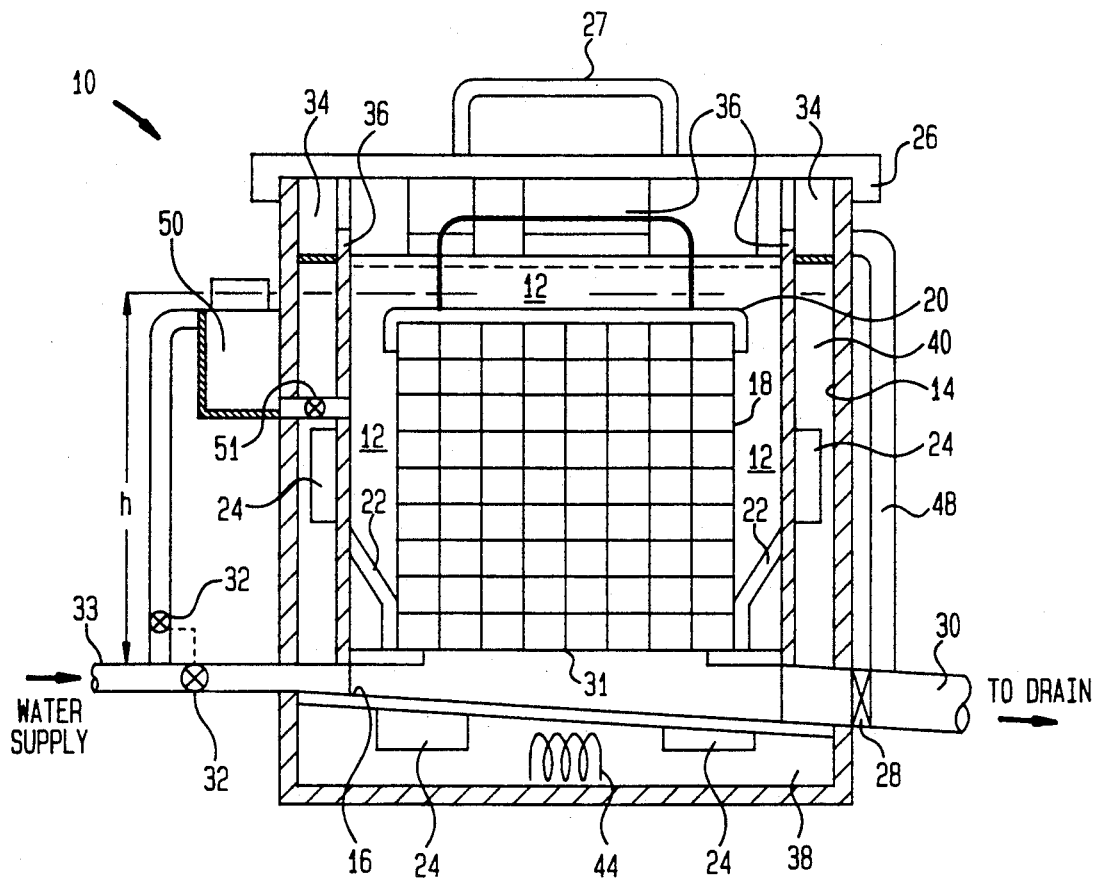
FIG. 1 displays a vertical cross-section of a preferred embodiment of an ultrasonic cleaning device for cleaning fruits and vegetables, constructed in accordance with the present invention, with a built-in power source, generator, transducers, control system, safety devices, etc.

With reference to FIG. 1, a device 10 is shown which is shaped in a way which resembles a small vessel or container, having an internal tank 12 confined by the device walls 14 and floor 16. Items such as vegetables or fruit to be cleaned are placed in tank 12, which is filled with water to a given and controlled level (h), and the cleaning process takes place in tank 12. The tank 12, when filled with water is herein referred to as the "cleaning tank". The cleaning tank 12 may be round, rectangular or square.

The items for cleaning may be placed directly into the cleaning tank 12, or preferably may be placed in a basket 18 constructed from perforated plates or wire netting, facilitating easy and simple placing and removal of the items. The basket 18 is properly shaped to fit fully into the cleaning tank 12 with all its contents being submerged under the water, while a suitable cover 20, which covers the basket 18, has a locking means which ensures that even lighter-than-water items which tend to float will be kept fully submerged.

Spacers 22 ensure that a distance of about 3 cm (shown in enlarged scale) is maintained between the basket 18 and the internal walls 14 and floor 16 of the tank 12. As described further herein, this distance enables the proper and free propagation of the ultrasonic waves from a set of ultrasonic transducers 24 through the water. A safety cover 26 having a handle 27, will trip a switch to activate the ultrasonic transducers 24, which will not operate unless the cover 26 is properly placed.

The dimensions of the cleaning tank 12 are matched with the vibration's energy intensity, frequency and direction, and the transducers' type, number and location, calculated to allow for a sufficient vibration intensity level in the entire cleaning tank 12 volume and on the surface of all items, even when the most severe resistance to and absorption of the vibration energy prevails, as is described further herein.

The floor 16 of the cleaning tank 12 is inclined, with a tap or valve 28 installed at its lowest point, making it possible to empty the water contained in the cleaning tank 12 directly into the drain via a pipe 30, without having to turn the device 12 over into the sink. The floor 31 of basket 18 is flat, and not inclined as the tank floor 16, to make it possible to place it on the kitchen working surface. An additional tap 32 facilitates filling the cleaning tank 12 from the water supply system via pipe 33. Both taps 28 and 32 may be operated manually or automatically, according to the operating philosophy.

A channel 34 surrounding the top edge of the cleaning tank 12 will collect via the vents 36 any overflowing water, as well as overflowing foam created by the flotation process, as is herein detailed. An ultrasonic generator with a power source, which produces high frequency voltage, transducers 24 which convert the high frequency voltage into ultrasonic vibrations, and a control system are installed in the space 38 below the cleaning tank 12 floor 16. Optionally the transducers 24 may also be installed in the space 40 confined between the double walls 14 of the tank 12.

Figure 2:
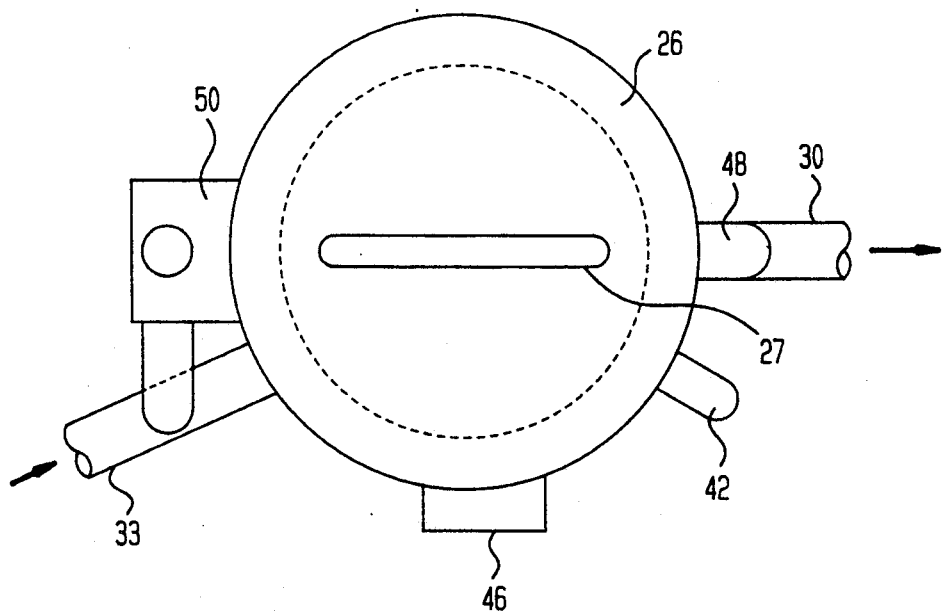
FIG. 2 is a top view of the device of FIG. 1.

A liquid indicator 42 (shown in the top view of FIG. 2), will display the correct water level, while a sensing device will prevent operation of the transducers 24 if the proper water level has not been reached. The transducers 24 will radiate controlled ultrasonic vibration energy into the water in the cleaning tank 12, which in turn will transmit the vibration energy to the surfaces of the items submerged in the water. The relative position of the transducers 24 and the direction of vibration are determined so as to provide sufficient vibration energy to all surfaces of the submerged items, regardless of the highly absorptive media formed by the soft fruit and vegetables. A heating element 44, shown schematically in FIG. 1, and a temperature-sensitive switch will control the temperature of the water, providing improved cleaning action and preventing overheating and damaging of the items.

Rotary knobs, push buttons or similar controls 46 provided on the external side of the device 10 will enable the user to control the process parameters manually or to select the right program which will handle all parameters automatically.

To operate the device 10, the basket 18 is filled with items, the cover 20 is locked, and the basket 18 is placed into the cleaning tank 12. The correct amount of water is added, manually or automatically, to the cleaning tank 12 and the proper amount of a mixture of cleaning, flotation and disinfecting agents is added. According to the type of fruit or vegetables, the proper program is selected by the user.

The ultrasonic generator radiates controlled ultrasonic vibrations through the transducers 24 into the water in the cleaning tank 12. The control system selects the correct intensity, frequency, temperature and operating duration, according to the operating program selected by the user, creating an optimal cleaning action for the specific combination of active agents, type of fruit and vibration field.

After a predetermined period and number of operation cycles the water is drained, manually or automatically, and fresh water is added for the rinsing cycle, which also employs an ultrasonic vibration field to wash away all the residual contaminants, as well as the remnants of the cleaning and flotation and disinfecting agents.

The cleaning agent can also contain foaming agents creating a flotation process that carries entrapped lighter-than-water contaminants to the surface. The foam may be hand skimmed or may be washed away by adding water to the cleaning tank 12, thus flooding the tank, with the water and foam overflow going through the vents 36 in the upper edge of the tank into the channel 34 carrying away the foam with its content via the tubes 48 into the drain. Manual skimming of the foam is possible in the manual operating mode.

It will be apparent to those familiar with the art of ultrasonic cleaning that fruit and vegetables submerged in water, and especially if densely packed, offer highly variable resistances to ultrasonic vibrations. This is due to their varying characteristics such as surface hardness, surface roughness or smoothness, uneven dispersal in the cleaning tank, non-uniform size and specific weight, and uneven sizes of the contact area of adjacent items—which differs substantially for example, between a cluster of grapes, berries, peaches or apples.

Therefore, a vibration field with an adjustable frequency, intensity, and operating duration is necessary to cope with all kinds of fruit or vegetables, with their different physical characteristics as well as the variety of multi-action cleaning agents used to clean the highly differing types of contaminants usually found on fruit and vegetables. Thus, there is ensured an improved level of cleaning action of the surface of all the cleaned items, including those most distant from the vibration source, and even on the inaccessible parts confined within grooves or between adjacent fruit as grapes in the middle of a cluster.

To further optimize the cleaning process, various types of cleaning, disinfecting, flotation and rinsing agents stored in separate small storage tanks 50 may be added automatically to the water in the tank in different quantities at various stages of the process, being carried in by a water stream released into the storage tanks through the electrically operated valve 51.

The following are examples of typical frequency bands and minimal durations of the cleaning process, adapted to various types and characteristics of fruit and vegetables. The parameters shown in these examples have been found experimentally to provide an optimal cleaning action regarding short durations and level of cleaning effect, for moderately contaminated items, using agents which dissolve, remove and disinfect all contaminants commonly existing on the surface of fruit and vegetables.

| CLEANED ITEM'S CHARACTERISTICS | ULTRASONIC(**) FREQUENCY +/−10% | DURATION(*) SEC |
| --- | --- | --- |
| leafy vegetables | 32 khz | 20-30 |
| soft fruit | 33 khz | 20-60 |
| rough-surfaced/rigid | 35 khz | 60-120 |
| hard/muddy | 36 khz | 0-180 |
| hard, grooved surface | 38 khz | 0-150 |

(*)The intensity and duration recommended for a given type may be adjusted to cope with different levels of contamination.
(**)The frequency of the vibration may be kept constant, say in the range of 37-38 khz, while the intensity can be changed in a range of 30%-100% to cope with the different types and characteristics of the items and the cleaning agents, producing the same levels of cleaning as those achieved with different adaptable frequencies.

It is clear to those familiar with the art that many combinations of frequencies, intensities, durations of process and cleaning media are possible. The drawings and descriptions given above represent only an example of a specific combination of device shape, range of vibration, and specific mixture of commercially available cleaning, disinfectant and flotation agents which treat, clean, and wash away the commonly existing contaminants at an improved rate and with reduced user effort as compared to hand washing, or submerged stirring, and washing as is done in public kitchens.

Optionally, a differently constructed device may be utilized, in which the transducers 24 are separated from the device containing the cleaning tank 12, whereupon the user may use a suitable available pot matched with the device dimensions and place the vibrating transducers in the water contained in said pot, while the control system can be separately installed. This arrangement is more adapted to manual operation, and is less costly.

Another option is to install additional transducers 24 in the space confined between the vertical double walls of the tank 12, thus creating a multi-directional vibration field which improves the vibration field intensity level throughout the entire volume of the cleaning tank 12.

To reduce the intensity of radiation needed, the tank 12 can be shaped with its width substantially narrower than its length with the ultrasonic waves radiated parallel to the shorter walls, thus enabling to reduce the power rating of each individual transducer 24 by reducing the necessary depth through which the vibration energy has to penetrate. This method demands an increase in the number of transducers 24 for a given volume, enabling calculation of an optimal economical balance point between the number and the intensity of the transducers 24.

Another method to reduce the required vibration intensity of the individual transducer 24 is to install additional transducers 24 within a housing protruding at the middle of the tank 12, reducing the power rating of the transducers approximately by a factor of four. In this option, the shape of basket 18 is adapted, as needed, to allow for placement of the additional transducers 24.

A different approach which also reduces the required power of the transducers while simultaneously increasing the cleaning efficiency is to stir the water in cleaning tank 12. This causes all the items submerged in the water to move and rotate relative to the transducers 24 in a pattern which exposes all sides of the items to the maximal level of vibration energy for a pre-selected duration, within a given level of probability.

Figure 3:
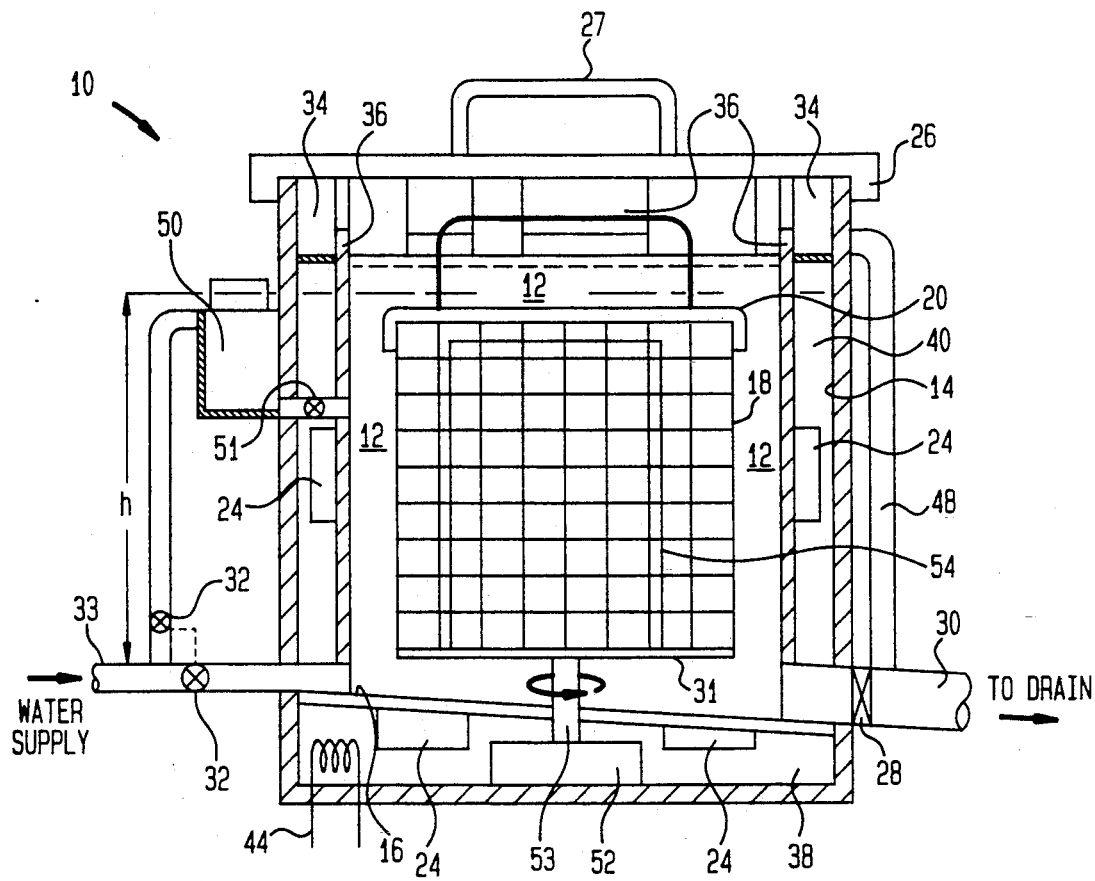
FIGS. 3-4 are respectively, a vertical cross-section and top view of an alternative embodiment of the device of FIGS. 1-2, featuring a rotating basket for stirring items placed in the device.
Figure 4:
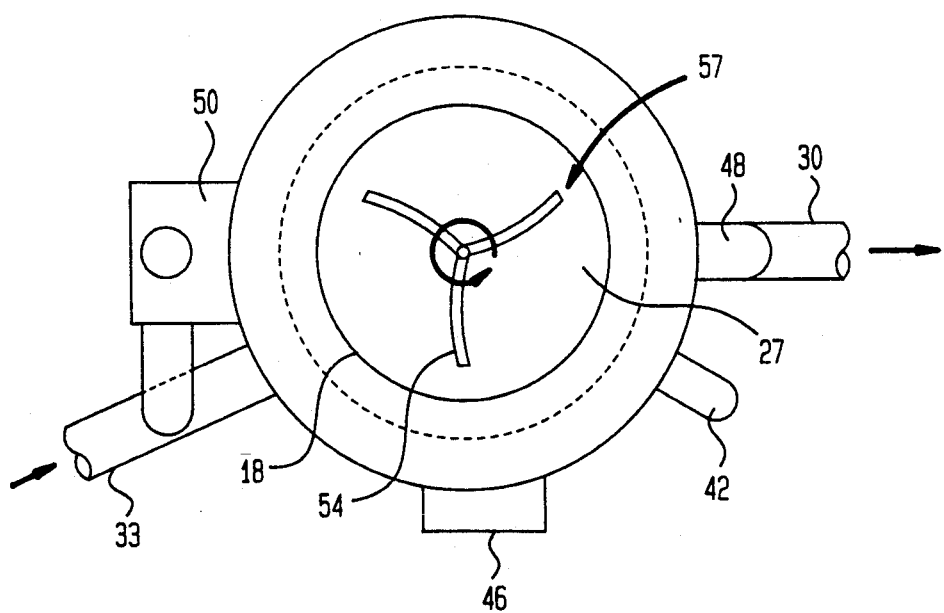

As shown in the alternative embodiment of FIGS. 3-4, the stirring movement can be activated by a motor 52 for rotating the basket 18 containing the submerged items around its symmetrical axis 53. In FIG. 4, covers 20 and 26 are not shown, revealing partitions 54 provided within the basket 18, which are shaped similar to the vanes of a centrifugal pump to force the submerged items to move and rotate as required relative to the transducers 24 within the walls 14 during basket 18 rotation, exposing all of their sides to the maximal direct energy. A suitable gap 57 is provided between the end of partitions 54 and the walls of basket 18 to enable the submerged items to move between them.

Figure 5:
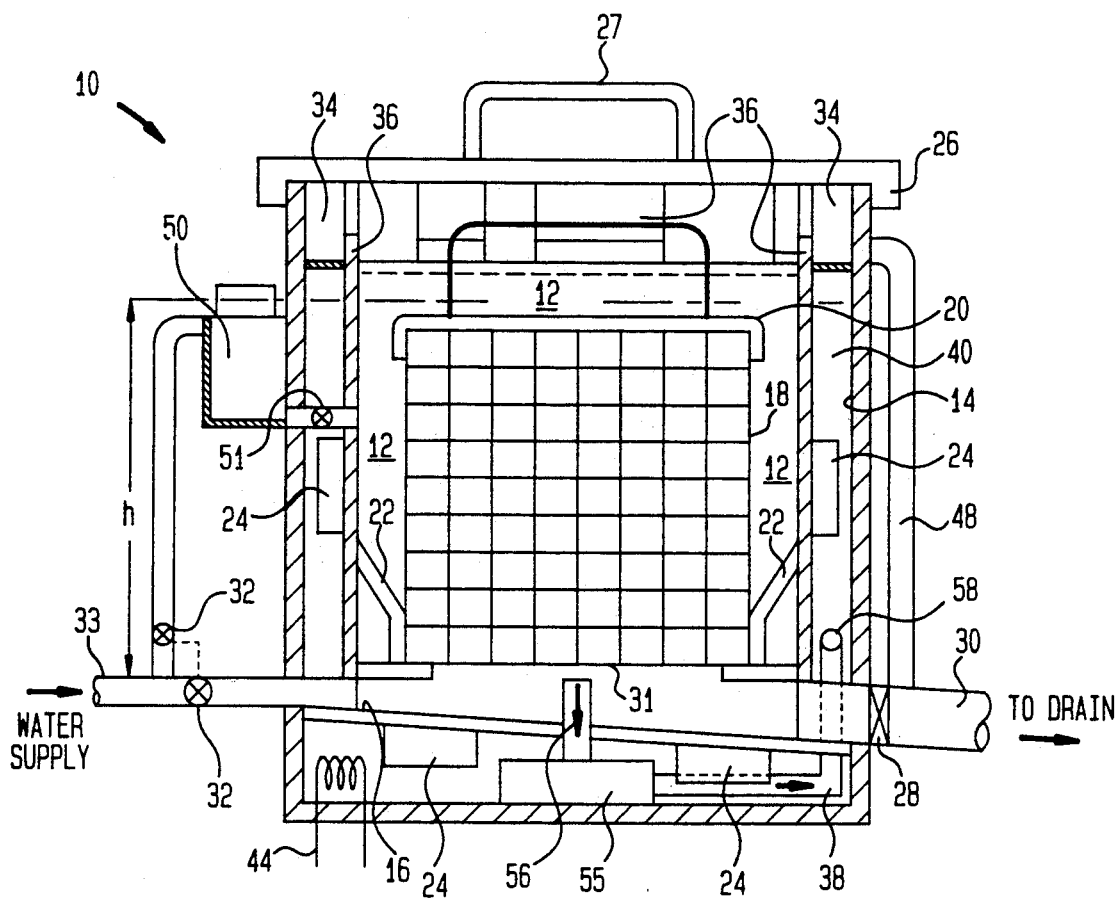
FIGS. 5-6 are respectively, a vertical cross-section and top view of another alternative embodiment of the device of FIGS. 1-2, featuring a pump for stirring the water in the device, and thus moving and rotating the items.
Figure 6:
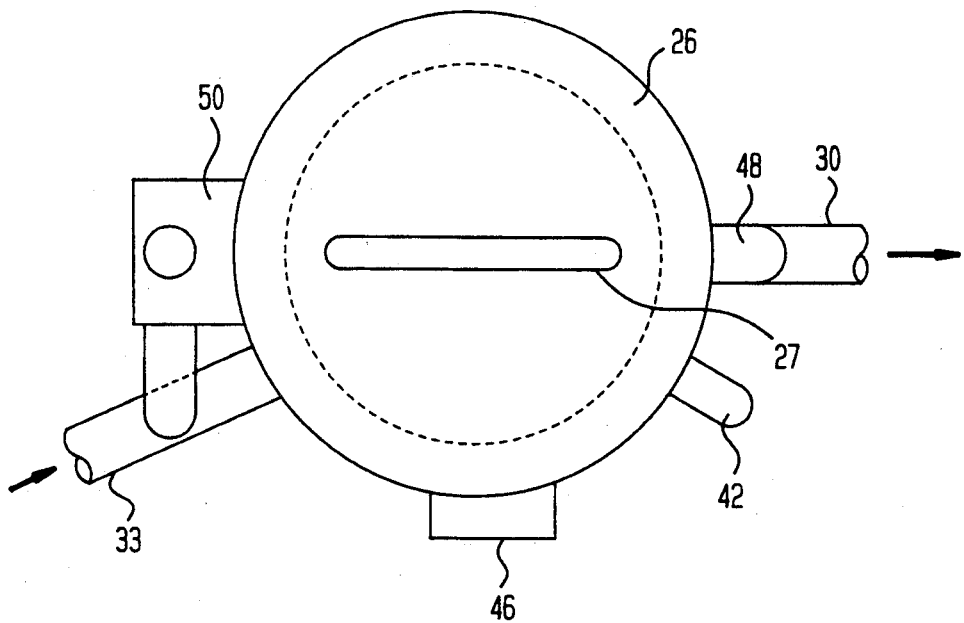

As illustrated in the alternative embodiment of FIGS. 5-6, a centrifugal pump 55 can also be utilized to move the water and the submerged items while the basket 18 remains stationary. This is achieved by sucking the water through an inlet 56 in the center of the floor 16 of the tank 12 and ejecting it tangentially relative to the tank internal vertical walls 14 at outlet 58, and parallel or inclined relative to the tank floor 16. This creates a vortex which will carry all the contents of the tank 12 (water and submerged items) into a vortex-like movement moving them toward the walls 14 or the floor 16 where the transducers 24 are placed, and back to the center while at the same time also rotating the items around themselves, exposing all of their sides to direct vibration.

It is clear that heavy vegetables such as potatoes will move differently than strawberries when stirred by the vortex or the rotating basket, and therefore the ejecting velocity of the water from the centrifugal pump or the rotating speed of the basket 18 is adjusted to suit different sizes and weights of items to ensure the proper exposure of all the sides of the items directly to the maximal vibration intensity.

It will also be apparent to those familiar with the art that a trade-off between the duration, the intensity and the number of available frequencies can be found to create an optimal process which results in a level of cleaning that is satisfactory from the health viewpoint, and provides a reasonable cleaning process duration at moderate cost.

The advantages of the device over hand washing and other cleaning methods currently used in public kitchens, can be summarized as follow:

a. The level of cleaning and removing of all common contaminants from the surface of fruit and vegetables is more than tripled.
b. There is no contact of the hands with detergent, or need to use uncomfortable rubber gloves.
c. All surfaces are cleaned, including those parts which are inaccesible to hand washing.
d. The ultrasonic vibration improves the solubility of the cleaning agents, thus further improving their activity level while reducing the necessary quantities.
e. The ultrasonic vibration itself kills small microorganisms.
f. There is a substantial saving in user effort and cleaning time, as large quantities of items can be cleaned simultaneously, which will encourage the use of better cleaned fruit and vegetables.

Having described the invention with regard to certain specific embodiments thereof, it is to be understood that the specification is not meant as a limitation as further modifications may now suggest themselves to those skilled in the art and it is intended to cover such modifications as fall within the scope of the appended claims.

We claim:

1. A device for simultaneously cleaning, disinfecting and washing fruit and vegetable items comprising:
    a cleaning tank, adapted to contain water in which at least one of cleaning, disinfecting and flotation agents are dissolved;
    at least one ultrasonic transducer arranged to provide ultrasonic vibrations through the water contained in said cleaning tank at a predetermined vibration energy level, and with a predetermined frequency, intensity, duration, and direction; and
    a basket adapted for placement within said cleaning tank so as to be rotatable by a motor, said basket having disposed therein a plurality of partitions each shaped as a vane such that during rotation of said basket, the water in said cleaning tank is stirred,
    the fruit and vegetable items placed in said basket being maintained therein in submerged fashion and being forced by said stirred water to move and rotate relative to said transducer and around themselves to ensure sufficient exposure of all sides of the fruit and vegetable items directly to a maximal level of vibration intensity regardless of the highly absorptive nature thereof when subjected to said ultrasonic vibrations traveling through the water as part of a cleaning process, to facilitate removal by washing from the surfaces thereof substantially all contaminants such as residual mud, dirt, microbiological flora, mold, worms, bacteria, germs, herbicides, pesticides and fertilizers,
    wherein said device further comprises a centrifugal water pump for additionally stirring said fruit and vegetable items by ejecting a portion of the water in said cleaning tank against the internal walls thereof, subjecting said items to a vortex-like movement and exposing all their surfaces to said vibration energy.

2. The device of claim 1 wherein said at least one transducer is adapted to generate said ultrasonic vibrations in a frequency band and with an intensity and duration of action as determined by a control means adjusted by a user, for application to different sorts of said fruit and vegetable items to facilitate the cleaning and removal of all types of said contaminants in various combinations of vibration modes using various cleaning agents.

3. The device of claim 2 wherein a set of operational instructions is provided in pre-programmed fashion in said control means, said instructions controlling parameters of said cleaning process relating to combinations of said fruit and vegetable items, their type, hardness, surface texture, type and level of contaminants, and cleaning agent types and concentrations, thereby providing a fully automatic cleaning process in accordance with said operational instruction set.

4. The device of claim 1 wherein said submerged fruit and vegetable items move in a pre-selected direction and pattern, such that said exposure of the external surface of each of said items to the maximal vibration energy level existing with said cleaning tank for a sufficient duration achieves a predetermined level of cleaning with a predetermined probability.

5. The device of claim 1 further comprising a heating element and associated temperature sensor placed within said tank for controlled heating of the water, to improve cleaning action.

6. The device of claim 1 further comprising a liquid level indicator and associated sensor for insuring a minimum water level in said cleaning tank during said cleaning process.

7. The device of claim 1 wherein said ultrasonic vibration frequency, intensity and duration are adjustable in accordance with a combination of parameters relating to fruit and vegetable type, surface hardness and texture, biological and chemical contamination levels, and various cleaning and disinfecting agents, to achieve the optimal cleaning activity.

8. The device of claim 1 wherein said ultrasonic vibrations are provided by a built-in ultrasonic generator and transducers.

9. The device of claim 1 wherein a plurality of said ultrasonic transducers are arranged to provide said ultrasonic vibrations in the form of at least one of unidirectional and multi-directional vibration fields, with the output of each of said transducers being controllable with respect to frequency, intensity and duration.

10. The device of claim 1 wherein said cleaning process is performed continuously and a mixture of said cleaning and disinfecting agents is pre-stored in at least one storage tank communicating with said cleaning tank so as to be applied automatically during said cleaning process.

11. The device of claim 10 wherein a plurality of cleaning agents having different concentrations are stored in multiple storage tanks for release into said cleaning tank at different stages of said cleaning process.

12. The device of claim 1 wherein the dimensions of said cleaning tank are adapted to a certain range of ultrasonic vibration frequencies, ensuring that a sufficient level of vibration energy will be transferred to the surface of all the items in said cleaning tank.

13. The device of claim 1 wherein the position of said ultrasonic transducers and the direction of propagation of said ultrasonic vibrations together with the controlled intensity, frequency and duration thereof, are adapted to ensure that a sufficient level of vibration energy is transferred to the surface all the items in said cleaning tank to ensure optimal cleaning.

14. The device of claim 1 further comprising means for collecting the foam and entrapped contaminants formed on the surface of the water during a flotation stage of said cleaning process.

15. The device of claim 1 further comprising means for separating said transducers from said items to be cleaned, said separation means defining a space facilitating free propagation of vibrations in said tank.

16. The device of claim 1 wherein said ultrasonic vibration generators and transducers are installed separate from the device containing said cleaning tank.

17. The device of claim 1 wherein said at least one transducer is installed in a housing at the center of said cleaning tank.

18. The device of claim 1 wherein said at least one transducer is installed within at least one housing protruding into the volume occupied by the water within said cleaning tank.

19. The device of claim 1 wherein said container has a width substantially smaller than its length.

20. A method of simultaneously cleaning, disinfecting and washing fruit and vegetable items comprising the steps of:
  providing a cleaning tank, adapted to contain water in which at least one of cleaning, disinfecting, and flotation agents are dissolved;
  providing ultrasonic vibrations through the water contained in said cleaning tank at a predetermined vibration energy level, and with a predetermined frequency, intensity, duration, and direction;
  placing a rotatable basket within said cleaning tank, said basket having disposed therein a plurality of partitions each shaped as a vane such that during rotation of said basket, the water in said cleaning tank is stirred,
  the fruit and vegetable items placed in said basket being maintained therein in submerged fashion and being forced by said stirred water to move and rotate relative to said transducer and around themselves to ensure sufficient exposure of all sides of the fruit and vegetable items directly to a maximal level of vibration intensity regardless of the highly absorptive nature thereof when subjected to said ultrasonic vibrations traveling through the water as part of a cleaning process, to facilitate removal by washing from the surfaces thereof substantially all contaminants such as residual mud, dirt, microbiological flora, mold, worms, bacteria, germs, herbicides, pesticides and fertilizers, and
  additionally stirring said fruit and vegetable items by ejecting a portion of the water in said cleaning tank against the internal walls thereof, subjecting said items to a vortex-like movement and exposing all their surface to said vibration energy.

21. The device of claim 20 wherein said submerged fruit and vegetable items move in a pre-selected direction and pattern, such that said exposure of the external surface of each of said items to the maximal vibration energy level existing with said cleaning tank for a sufficient duration achieves a predetermined level of cleaning with a predetermined probability.

22. The device of claim 1 wherein said basket further comprises a cover for ensuring that items which tend to float on the water are kept fully submerged.

* * * * *